United States Patent [19]

Graham

[11] Patent Number: 5,331,554
[45] Date of Patent: Jul. 19, 1994

[54] METHOD AND APPARATUS FOR SEMANTIC PATTERN MATCHING FOR TEXT RETRIEVAL

[75] Inventor: James M. Graham, San Jose, Calif.

[73] Assignees: Ricoh Corporation, Menlo Park, Calif.; Ricoh Company Ltd., Tokyo, Japan

[21] Appl. No.: 988,729

[22] Filed: Dec. 10, 1992

[51] Int. Cl.$^5$ ............................................. G06F 15/38
[52] U.S. Cl. .................................................. 364/419.07
[58] Field of Search ................. 364/419.08, 419.13, 364/419.07, 419.19

[56] References Cited

U.S. PATENT DOCUMENTS

5,056,021 10/1991 Ausborn .......................... 364/419.08
5,111,398 5/1992 Nunberg et al. ............... 364/419.08

Primary Examiner—Roy N. Envall, Jr.
Assistant Examiner—Xuong M. Chung
Attorney, Agent, or Firm—Blakely, Sokoloff, Taylor & Zafman

[57] ABSTRACT

A method and apparatus utilizing automated semantic pattern recognition whereby a user of a manual enters a query regarding information in the text of the manual and the invention displays the locations in which information responsive to the query is located. The present invention includes a computer that stores a data structure representing the natural language text of a manual, the structure being a tree structure having nodes, wherein each node represents information from associated locations of the text. The nodes at higher levels of the tree represent general categories of information. Nodes at succeedingly lower levels of the tree represent succeedingly more specific categorical subsets of the general categories of information represented at the higher levels by ancestors of the lower level nodes. The query is formatted into a query data structure that is similar in format to the node structure representing the text. The query data structure is compared to each node in the tree. If the degree of similarity between the query and the node exceeds a predetermined threshold value after taking into account the degree of similarity between the ancestors of the node and the query, then the locations associated with the node are displayed on a video monitor as locations containing information responsive to the query.

26 Claims, 4 Drawing Sheets

QUERY = PLEASE SHOW ME THE SECTION ON
REPLACING THE EXPOSURE LAMP.

SIMPLIFIED
SEMANTIC
REPRESENTATION: ((REPLACING) (EXPOSURE LAMP))

METHOD AND APPARATUS FOR SEMANTIC PATTERN MATCHING FOR TEXT RETRIEVAL

BACKGROUND AND SUMMARY OF THE INVENTION

The present invention is a method and apparatus utilizing automated semantic pattern recognition whereby a user of an instruction or repair manual enters a query regarding information in the text of the manual and the invention displays the locations in the text of information responsive to the query. Although the invention is described in terms of its implementation as an aid to a user of a manual, many of the most important features of the invention have general application and are not intended to be limited to text in a manual format.

Repair persons or users of a piece of equipment often turn to a manual for instructions regarding operation, maintenance of repair. The repair person or user typically must probe the table of contents and the index for relevant words that might point to relevant pages in the text. Although effective, this method is time consuming. Search time frequently is an important constraint, such as when a customer service representative needs to respond quickly to questions from customers over the telephone.

The present invention uses semantic pattern recognition to rapidly locate relevant information in the text of a user manual. Semantic pattern recognition has long been thought of as a possible solution for improving text and information retrieval. Unfortunately, most natural language understanding systems have lacked the lexical and semantic depth necessary for handling the broad range of semantic situations typically encountered as part of daily human activities. However, there are some areas where a language-oriented method of organization and comparison is quite useful. One such domain encompasses information that can be organized topically into subject categories. A prime example of topical organization is the typical user or repair manual, which is divided into sections by topic and uses terse explanations comprised of highly descriptive words and phrases.

The present invention locates information in the natural language text of a manual using a computer that includes a video monitor and a memory device for storing a data structure representing the natural language text. The data structure has the form of a tree structure having nodes arranged at different levels of the tree structure, wherein each node represents information from associated locations in the text, each location having a corresponding location identifier, such as a page or section number. Each node contains node constituents representing words or phrases from the text, and each node may be represented by a vector comprising node constituents as elements. The parsing of text into its contextually related constituents is well known in the art.

Typically, the nodes at higher levels of the tree represent general categories of information. Nodes at succeedingly lower levels in the tree usually represent succeedingly more specific categorical subsets of the general categories of information represented at the higher levels. For example, nodes at one level may represent chapter headings from a manual, while nodes at the next level may represent sections within a chapter, and nodes at the subsequent level may represent subsections thereof. Accordingly, a node at one level in the tree is referred to as a "parent" node, while a node at a level immediately below the parent node and representing a categorical subset of the information represented by the parent node is referred to as a "child" node of that parent. The parent node and other nodes at the higher levels of the tree representing more general categories of information than a particular child node are referred to as the "ancestors" of that child node.

The present invention takes advantage of contextual propagation from the ancestors of a node to determine with a given degree of certainty whether the node contains information responsive to a query. The query is entered by a user or otherwise input into the system in the hope that the natural language text contains the answer to the query. The query is formatted into a query data structure. The query data structure is compared to a node to produce a comparison value representative of the degree of similarity between the query and the information represented by the node. The comparison value is enhanced by an amount representative of the degree of similarity between the query and the information represented by ancestors of the node to produce an enhanced comparison value. If the enhanced comparison value exceeds a predetermined lower bound and the node contributes information responsive to the query, then the location identifiers associated with the node are stored in memory. The process of comparing the query data structure to a node, enhancing the comparison value and storing the location identifiers is repeated at each node in the tree structure. After these steps have been performed for the entire tree structure, the stored location identifiers are displayed on the video monitor.

Note that the present invention tests whether the node contributes information responsive to the query in addition to determining whether the enhanced comparison value exceeds a predetermined lower bound. Because the enhanced comparison value represents the inclusion of information from ancestor nodes, the enhanced comparison value may exceed the lower bound based solely on the degree of similarity between the query and the information represented by the ancestors of the node, even if there is no match at all between the current node and the query. Accordingly, it is necessary to test whether the current node contains at least some information responsive to the query.

In one embodiment, the query is formatted into a query data structure having query constituents that are similar in format to the node constituents of the text data structure. That is, each query constituent represents a word or phrase contained in the query. The query data structure is compared to a node in the tree to produce a match vector having a number of match elements, the match vector being representative of the degree of similarity between the query data structure and the node. Each match element corresponds in position to one of the query constituents and to one of the elements of a parent vector, the parent vector having been initialized to zero.

The resulting match vector is merged with the parent vector by comparing each parent vector element to each corresponding match element to produce a merge vector having a number of merge elements, each merge element corresponding in position to a parent element, and by setting each merge element to be equal to the greater of the corresponding parent element and the corresponding match element.

A contribution flag is set to true if any of the match elements is greater than zero and, at the same time, greater than or equal to the parent element corresponding to that match element. If the contribution flag has been set to true, then: (1) the merge elements are averaged to produce a merge vector average; and (2) if the merge vector average equals or exceeds a predetermined threshold value, then the location identifiers associated with the node are stored for display. Note that the terms "enhanced comparison value" and "lower bound" were used above when referring to the invention in its broadest sense. In this particular embodiment, the merge vector average serves as the enhanced companion value and the threshold value as the lower bound.

Whether the contribution flag has been set to true or not, the invention repeats the process of producing the match vector, merging the match vector with the parent vector, determining whether to set the contribution flag, and, if the contribution flag is set to true, averaging the merge elements and storing the relevant location identifiers, wherein all of these steps are performed at each node after substituting for the parent vector the merge vector that resulted from performing the merging step on the parent node of the node under examination. After these steps have been performed at each node in the data structure, then the stored location identifiers are displayed on the video monitor.

The foregoing summary demonstrates that through the merging process, the invention takes advantage of the contextual propagation of comparison properties to a node from its ancestors in the tree structure. Instead of just comparing the match value to the threshold, the invention compares a new value representative of the degree of similarity not only of the present node to the query, but also of the degree of similarity between the ancestors of the present node and the query. Thus, a node which might otherwise not pass the threshold would be counted as containing relevant information because it has inherited comparison traits from its ancestors.

DETAILED DESCRIPTION OF THE INVENTION

The present invention is a method and apparatus utilizing automated semantic pattern recognition whereby a user of an instruction manual enters a query regarding information in the text of the manual and the invention displays the page numbers in which information responsive to the query is located. The pattern matcher also calculates and displays a confidence level or score representing how confident the system is that the information on the retrieved page is responsive to the query. Although the invention is described in terms of its implementation as an aid to a user of a manual, many of the most important features of the invention have general application and are not intended to be limited to text in a manual format.

Implementation of the invention will be explained below with reference to the figures and the program code included in the Appendix. The pattern matching of the invention may be undertaken using Common LISP running on, for example, a DECstation 5000 workstation.

Figure 1:
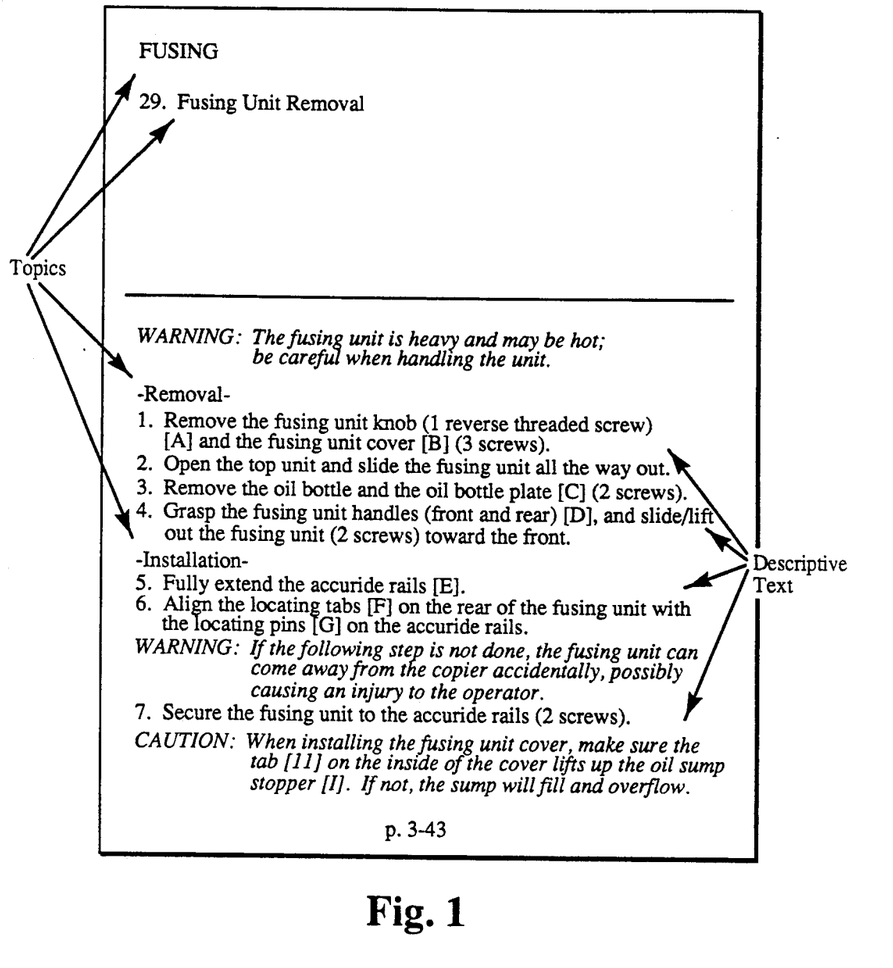
FIG. 1 is a page from a photocopier manual.
Figure 2:
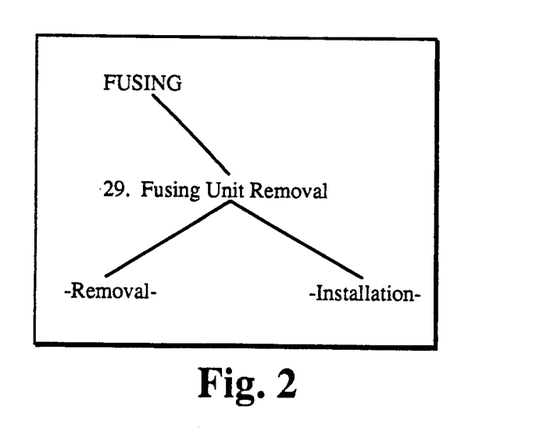
FIG. 2 is a tree structure representing information from the page of FIG. 1.

FIGS. 1 and 2 demonstrate how text from a manual may be formatted into a teen structure. FIG. 1 represents a page from a copier manual. Using a public domain product such as MChart, information from the page may be parsed into a Common LISP data structure, and fitted into a tree structure by topic, as represented in FIG. 2.

Referring to the figures, although "Fusing" and "Fusing Unit Removal" typically would be listed as topics in the table of contents, "Removal" and "Installation" would not be listed. Thus, the resulting text data structure as shown in FIG. 2 contains more information than the table of contents, yet avoids extraneous information contained in the full text. As a result, a search of the tree structure is faster and more efficient than a full text database search, and more accurate and comprehensive than a search of the table of contents.

Figure 3:
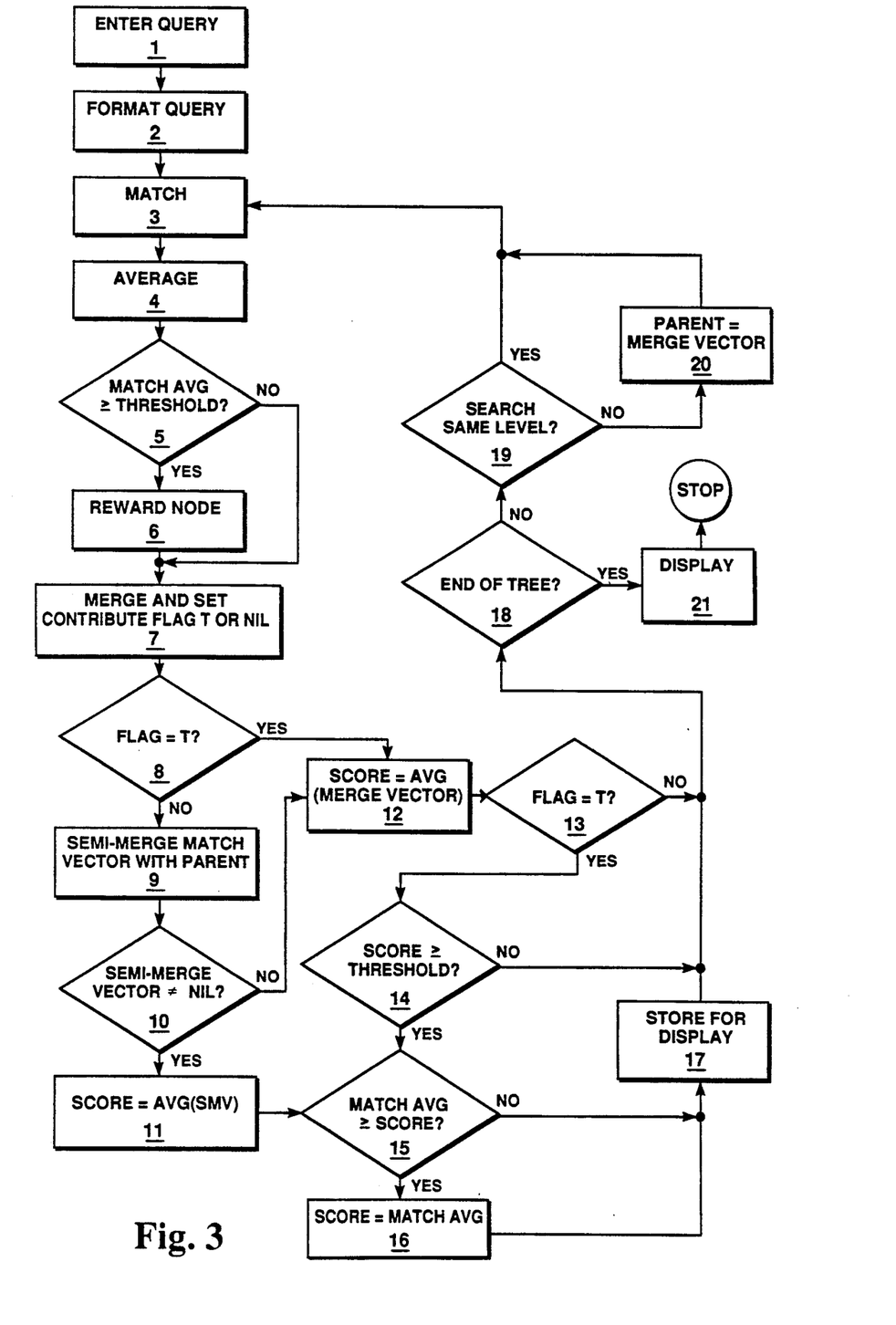
FIG. 3 is a flow chart illustrating the operation of the present invention.

FIG. 3 is a flow chart illustrating the operation of a preferred embodiment of the present invention. To begin, a query is entered through an input device, such as a keyboard, regarding the information that is contained in the text and that is correspondingly represented in the text tree structure, Step 1. As indicated in Step 2, the query is then parsed into a LISP data structure by a program such as MChart.

Referring to the Appendix, from this point on, the implementation of FIG. 3 may be represented by the main LISP routine search-parsed-tree, which compares the query to text branch nodes in the tree structure representing sections of a manual. The comparison within each section is performed by the routine new-search-branch, which is called by search-parsed-tree. In new search branch, the parsed query data structure is represented by pattern, and the tree text structure by branch.

Moving to Step 3, after parsing, the query data structure pattern is compared to a node (represented by parsed-data) of the text structure branch, starting at the highest level in the tree. This comparison results in the production of a match vector match-result. The match vector contains numerical elements representing the degree of similarity between the node and the query. The position of each element of the match vector corresponds to the position of a query constituent in the query data structure.

The comparison process is carried out by the function match-content, which in turn calls the routine compare-two-language-structures. Within compare-two-language-structures, each query constituent is compared to each node constituent at the current node, resulting in a matrix of "constituent values," each such value being representative of the degree of similarity between a query constituent and a node constituent. The comparison, uses a knowledge base, a technique known in the prior art, to semantically broaden the search by including contextually related forms of the query constituent in the comparison. For example, the constituent "hard drive" would also be represented by its synonym "fixed disk."

With respect to the details of the comparison, in general, each element of the match vector is set to equal the highest constituent value obtained as a result of comparing that element's corresponding query constituent to each of the node constituents. For example, referring to FIG. 4a, assume that the user enters the query "Please show me the section on replacing the exposure lamp." A simplified semantic representation of this query would take the form: ((replacing) (exposure lamp)). Also assume that the text of a repair manual has been formatted into the simplified tree structure shown in FIG. 4b, wherein the first section is entitled "REPLACEMENT AND ADJUSTMENT". After formatting, this string may be simply represented as ((replacement) (adjustment)).

Figure 4A:
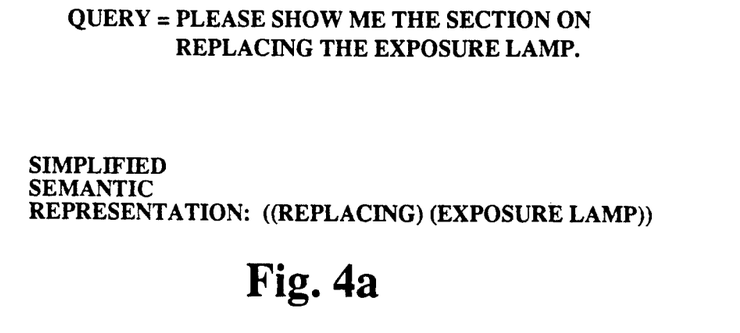
FIG. 4a illustrates a simplified semantic representation of a query.

To generate the match vector, each query constituent is compared to each node constituent, resulting in a constituent value for each comparison. Thus, as shown in the matrix of FIG. 4c, the comparison of the query constituent "replacing" with the node constituent "replacement" generates a constituent value of 1.0 because those two terms are semantically equivalent. On the other hand, a comparison of the query constituent "replacing" to the node constituent "adjustment" results in a constituent value of 0.0 because two terms are completely dissimilar. As for the query constituent "exposure lamp", that term matches neither node constituent. As a result, the first match vector element, corresponding to the first query constituent "replacing", is set to 1.0 because that is the highest constituent value obtained as a result of comparing the query constituent "replacing" to each of the node constituents. The second match vector element, corresponding to the second query constituent "exposure lamp", is set to 0.0 because that constituent produced no matches with the node constituents. Thus, the resulting match vector would take the form (1.0 0.0).

In the unlikely event that the comparison of two or more query constituents to the same node constituent leads to the highest constituent values obtained for those query constituents, then only the greatest of those constituent values is included in the match vector. The match vector positions corresponding to the remaining query constituents that result in the highest match to the same node are then filled with the next highest constituent values obtained as a result of comparing those remaining corresponding query constituents to the other node constituents. This process continues if two or more of the remaining query constituents again result in the highest match to the same node constituent. This feature, implemented by the function run-best-path, provides for a more accurate determination of the similarities between the node and the query.

Returning back to new-search-branch, after the match vector match-result has been calculated in Step 3, the elements of the match vector are then averaged as shown in Step 4. As indicated in Step 5, this match vector average is then compared to a predetermined threshold. If the average equals or exceeds the threshold, then this node is deemed to match the query and a constant value is added to the match vector average, as shown in Step 6. This average represents the confidence level of the match of the node to the query. The addition of the constant is performed because if a node results in a match without the aid of contextual propagation from its ancestors, then the user can have greater confidence that information responsive to the query is found on the page containing the corresponding node. Conversely, the more a match relies on contextual propagation the less certain the user can be that this more "indirect" match has found the correct page. Accordingly, if the current node alone triggers the threshold, then the value of the match vector average is enhanced or "rewarded". This average, whether enhanced or not, is compared later on in the process with other confidence scores obtained by contextual propagation to determine the most representative confidence score of the match. The match vector average is denoted by new-match-results in the LISP code and is the product of the function individual-match in which the constant value is added.

Starting with Step 7, the invention begins to account for the contextual relationship between a node and its ancestors. Initially, the elements of a parent vector, parent, are set to zero or nil value. After the query is compared to a particular node starting at the highest level in the tree structure, the function new-merge-tree-vectors then merges the resulting match vector, match-result, with the parent vector to produce a merge vector, merged-vector, as indicated in Step 7. Note that the position of each element of the merge vector corresponds to the position of an element of the parent vector. Merger is accomplished by setting each merge vector element equal to the corresponding parent element or the corresponding element of the match vector, whichever is larger.

As the search algorithm of the invention proceeds down a tree branch and compares the query to child nodes, each succeeding parent vector is set to equal the merge vector that was calculated at the preceding level. This accounts for the contextual relationship between a node and its ancestors because the parent vector now contains information about the similarities between the query and all contextually related ancestors of the current node. In this manner, the invention takes advantage of information inherited from ancestor nodes that hold more general information than that held by the node currently subject to scrutiny. Thus, although the match vector average alone may not exceed the threshold, the average of the elements of the merge vector may do so and indicate a match because the merge vector average will always be greater than or equal to the match vector average due to parental contribution.

The function new-merge-tree-vectors also sets a flag, contribute, which indicates whether the current node "contributes" to the match of that node with the query. Because the merge vector average represents the inclusion of information from the parent node, the average may exceed the threshold based solely on the match values contained in the parent vector even if there is no match at all between the current node and the query.

To avoid this problem, the flag of Step 7 is set only if one or more elements of the match vector match-result are greater than zero and, at the same time, determined to be greater than or equal to the value of the corresponding elements of the parent vector. In this manner, the flag indicates that the node currently being examined includes information responsive to the query.

Figure 4B:
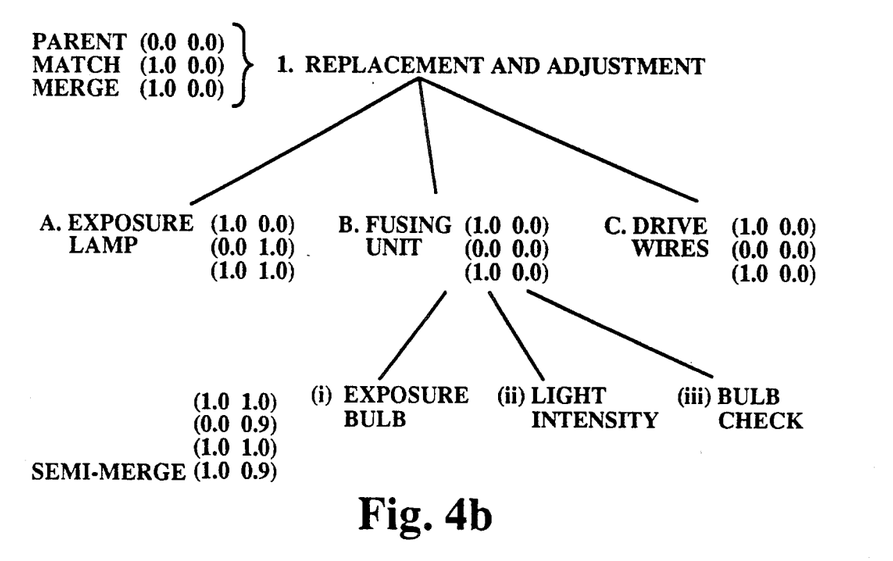
FIG. 4b illustrates the process of the present invention applied to the formatted text of a manual.
Figure 4C:
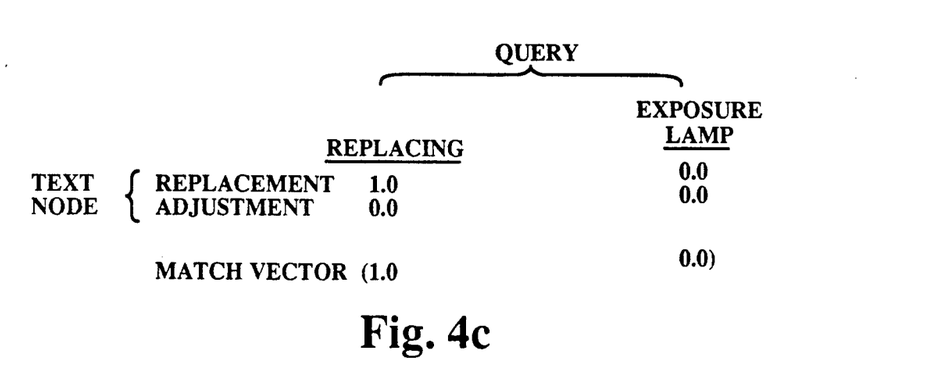
FIG. 4c illustrates the formation of the match vector.

For example, referring back FIG. 4b, the match vector was calculated to be (1.0 0.0). After merging the match vector with the parent vector, which is initialized to (0.0 0.0), the merge vector (1.0 0.0) results. That merge vector becomes the parent vector as the search proceeds down to the next level of the tree, where the query is compared to the node representing "Exposure Lamp". Here both the query and the node have the term "Exposure Lamp" in common. The resulting match vector would take the form of (0.0 1.0), which when merged with the parent vector (1.0 0.0) results in the merge vector (1.0 1.0). Moreover, the comparison of the match vector (0.0 1.0) with its parent (1.0 0.0) causes the setting of the contribute flag to true indicating that the current node contributes more to the node than the parent vector because the second component of the match vector, 1.0, is greater than the second component of the parent vector 0.0. Taking the average of the merge vector results in the merge vector average $(1.0+1.0)/2=1.0$. Assuming that the threshold were set to 0.8, then the threshold would be exceeded and a match would be deemed to have occurred. Moving down to the next level of nodes, the parent vector would be set to equal the merge vector (1.0 1.0).

The pattern matcher of the invention also accounts for the fact that even though the contribute flag may not have been set previously, the current node may still be able to trigger a match with the query without the aid of full contextual propagation. In Step 8, the contribute flag is tested. If it is not set to true, then this means that none of the match vector elements equaled or exceeded any of the parent vector elements. However, it may be the case that by taking only partial advantage of contextual propagation from ancestor nodes, the current node may trigger a match even though the similarity of the current node to the query is not as great as that represented by the parent vector.

This situation is exploited starting at Step 9, wherein the match vector is only partially merged with the parent vector. The function propagate-context performs a one-by-one substitution of match elements into the parent vector and compares the average of this "semi-merge" vector to the threshold. In detail, the first element of the parent vector is replaced with the first element of the match vector, and then the average of this semi-merge vector is compared to the threshold. If the threshold is equaled or exceeded and the substituted match vector element is greater than zero, then execution of the propagate-context function stops and the semi-merge vector is returned as propagated-results. (Testing whether the substituted element is greater than zero ensures that the node contributes information responsive to the query). On the other hand, if the threshold is not exceeded during that substitution or the substitute element is of zero value, then propagate-context replaces the next element of the parent vector with the corresponding element of the match vector, resulting in a semi-merge vector containing all the elements of the parent vector except for the second element, which now constitutes the second match element. The function propagate-context then compares the average of that semi-merge vector to the threshold. This process continues until either the first time the threshold is exceeded using a non-zero match vector element or each element of the parent vector has been subject to substitution. If the threshold is not exceeded during any of the substitutions, then the vector propagated-results is assigned a value of nil.

If propagate-context does in fact result in a non-nil propagated results semi-merge vector, then the confidence level tree-node-score is, at least temporarily, set equal to the average of the semi-merge vector, as shown in Step 11.

For example, proceeding to the next level in FIG. 4b, the query would first be compared to the node representing "Exposure Bulb", using the previously calculated merge vector (1.0 1.0) as the parent vector. The match with this node would produce a match vector such as (0.0 0.9) because of the semantic similarities between "Exposing Bulb" and "Exposure Lamp". When this match vector is merged with the parent vector, the result is the merge vector (1.0 1.0), which certainly exceeds the threshold. However, the comparison of the match vector with the parent vector does not result in the setting of the contribute flag because when comparing the match elements to the parent elements, the first match element is less than the first parent element 1.0, and the second match element 0.9 is less than the second parent element 1.0. Thus, at this point, the algorithm would overlook the match between the query and this node, meaning that a page containing highly relevant information would not be retrieved.

However, this drawback is overcome by the use of this semi-merge process. At the start of this process, the first element of the match vector would be substituted for the first element of the parent vector resulting in the vector (0.0 1.0), the average of which would not exceed the threshold. Thus the process would move on to substituting the second element of the match vector for the second element of the parent vector, resulting in the semi-merge vector (1.0 0.9), the average of which would exceed the threshold. Therefore, the semi-merge process accounts for the fact that a child node can contribute significantly to a match, although it may not set the contribute flag to true, resulting in the retrieval of highly relevant information.

The preceding example highlights the advantages of using the contextual relationship between a node and its ancestors in semantic pattern recognition. Without utilizing that relationship, the pages associated with the nodes containing the phrases "Exposure Lamp" and "Exposure Bulb" alone would not have been determined to have represented information relevant to the query, unless the threshold were lowered substantially. However, lowering the threshold would have degraded the system performance and caused page numbers of nonresponsive pages to be deemed as matches.

Referring back to Step 10, if the propagate-context function results in no matches, i.e., a nil semi-merge vector, then the confidence level tree-node-score is set to equal the average of the merge vector elements, as shown in Step 12, and the contribute flag is tested, Step 13. If the flag is nil then at this point it has been determined that the current node does not match the query even though the match vector average may exceed the threshold. Thus, the search moves on to another node.

If, however, the flag is true then the merge vector average is compared with the threshold, Step 14. If the threshold is exceeded, this means that the current node, with the help of full contextual propagation, results in a match. As mentioned above, by testing the contribute flag, the invention ensures that the match was not just due to the contributions of ancestor nodes as represented by the parent vector, but was also the result of a contribution of the current node.

At this point in the process, it has been determined whether the threshold has been exceeded by either the current node itself (as represented by the match vector), the current node taking partial advantage of contextual propagation (as represented by semi-merge vector propagated results), or the current node taking full advantage of contextual propagation (as represented by the merge vector merged vector). The averages of these vectors represent alternative measures of confidence level scores at a particular node. As shown in Steps 15 and 16, the confidence level tree-node-score is set equal to the match vector average new-match-results if that average exceeds the previously calculated score, which is either the semi-merge vector average or the merge vector average depending on whether the contribute flag is true or nil. Otherwise, the score remains unchanged. This ensures that the most accurate confidence level is stored for the match of the current node to the query, along with the page number(s) (or other location identifiers) of the matched node, Step 17.

After the score has been stored for the matched page(s), or, alternatively, if the current node resulted in no match even with the help of contextual propagation, then the match process is continued on sibling nodes on the same level or child nodes at the next level, Step 19, as long as there are nodes left in the tree that have not been tested, Step 18. If a child node is to be tested, then the parent vector for that node is set to the current merge vector in order to continue contextual propagation, Step 20. Once the entire tree has been searched, then the page numbers of the pages that resulted in a match are displayed along with their corresponding confidence levels, Step 21.

Figure 5A:
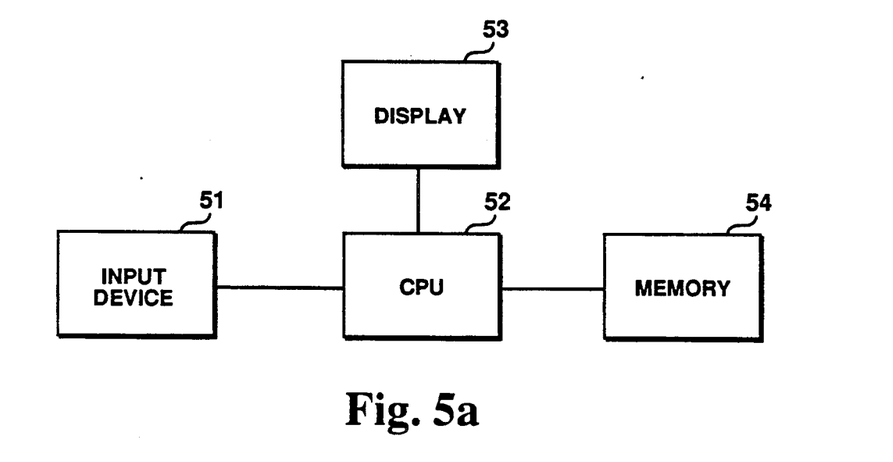
FIG. 5a is a simplified Step diagram of the apparatus of the present invention.
Figure 5B:
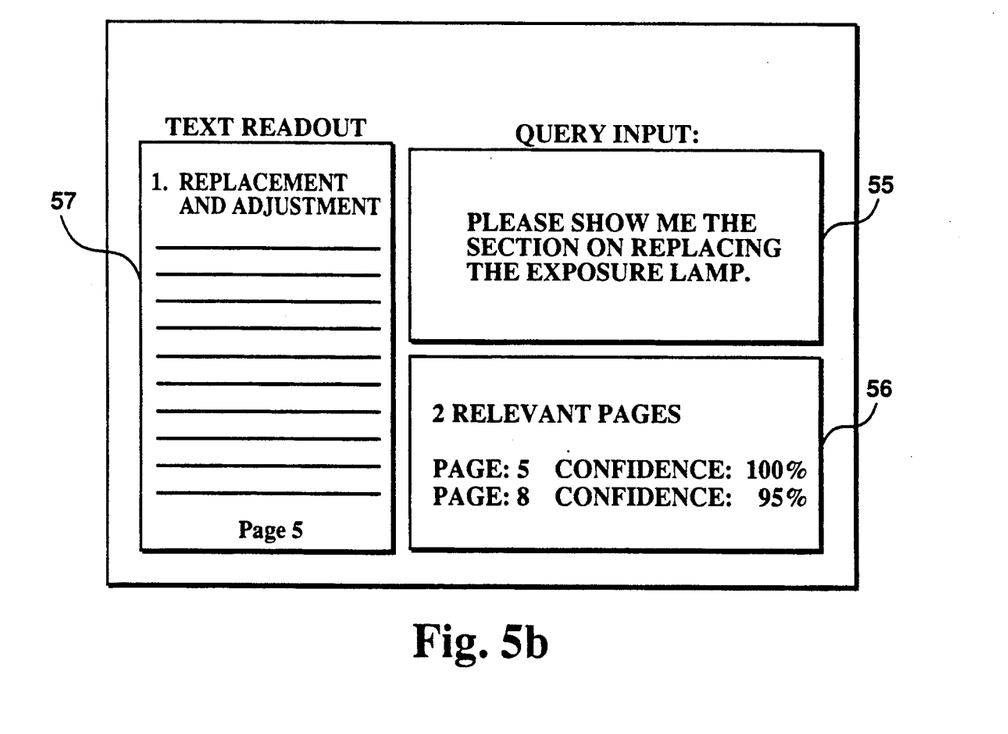
FIG. 5b is an example of the display screen representing operation of the present invention using the query and text data structure of FIGS. 4a and 4b.

FIG. 5a is a simplified blocked diagram of the apparatus used to implement the method of the present invention. The query is inputted through input device 51. All calculations and the comparison of the query to each node of the tree structure representing the text is carried out by a central processing unit 52, and the results displayed on display 53. A memory 54 is used for storing the text data structure and other information. FIG. 5b is one embodiment of the layout of the display showing the query input being displayed in field 55 and the numbers of the pages containing responsive information and the accompanying confidence levels displayed in field 56. Field 57 demonstrates that the user has the option of retrieving the text of the manual, including those pages containing information responsive to the query.

In this particular example, FIG. 5b shows the results of entering the query of FIG. 4a where the user manual is represented by the tree structure of FIG. 4b. In Field 56 "page 5" represents the page containing the subsection entitled "Exposure Lamp". Referring back to FIG. 4b, the resulting merge vector for that subsection node is (1.0 1.0). Thus the merge vector average and the accompanying confidence level score $(1.0+1.0)/2=1.0$ or 100 percent. Similarly, page 8 contains a node representing the sub-subsection entitled "Exposure Bulb", which resulted in a semi-merge vector of (1.0 0.9) and a confidence level of $(1.0+0.9)/2=0.95$ or 95 percent. Thus, the invention provides a convenient way for a user or a repair person to know with relative certainty which pages of a manual contain information relevant to the task at hand without the need for manually paging through the index and the indicated text.

Although the invention has been described in conjunction with the preferred embodiment, it will be appreciated that various modifications and alterations might be made by those skilled in the art without departing from the spirit and scope of the invention.

What is claimed is:

1. A method for locating information in a natural language text using a computer including a video monitor and a memory device for storing a data structure representing the natural language text,
   wherein said data structure has a tree structure having nodes and levels, each node representing information from associated locations in said text, each of said locations having a corresponding location identifier, the information in a node being a categorical subset of information represented by a parent node of that node, each node being one level below its parent node in the tree structure and containing node constituents, said parent node and the nodes at higher levels of the tree structure that represent more general categories of information than the information represented by a node being ancestors of that node,
   the method comprising the steps of:
   formatting a query regarding information in the text into a query data structure;
   comparing the query data structure to a node to produce a comparison value representative of the degree of similarity between the query and the information represented by the node;
   enhancing the comparison value by an amount representative of the degree of similarity between the query and the information represented by ancestors of the node to produce an enhanced comparison value; and
   storing the location identifiers associated with the node if the enhanced comparison value exceeds a predetermined lower bound and the node contributes information responsive to the query.

2. The method of claim 1, further comprising the steps of:
   performing said comparing, enhancing, and storing steps at each node in the tree structure; and
   displaying the stored location identifiers on the video monitor.

3. A method for locating information in a natural language text using a computer including a video monitor and a memory device for storing a data structure representing said natural language text,
   wherein said data structure has a tree structure having nodes and levels, each said node representing information from associated locations in said text, each said location having a corresponding location identifier, the information in a node being a categorical subset of information represented by a parent node of that node, each said node being one level below its parent node in said tree structure and containing node constituents,
   said method comprising the steps of:
   formatting a query regarding information in said text into a query data structure containing constituents of said query, each said query constituent representing a word or a phrase contained in said query;
   producing a match vector having a plurality of match elements, said match vector being representative of a degree of similarity between said query data structure and one of said nodes, and each said match element corresponding in position to a predetermined query constituent and to a predetermined parent element of a parent vector;
   merging said match vector with said parent vector to produce a merge vector having a plurality of merge elements, wherein each said merge element corresponds in position to a predetermined parent element by setting each said merge element to be equal to the greater of its corresponding parent element and the match element corresponding to the corresponding parent element;

setting a contribution flag to true if any of said match elements is greater than zero and, at the same time, greater than or equal to said parent element corresponding to said match element;

if said contribution flag is set to true:
averaging said merge elements to produce a merge vector average;
storing the location identifiers associated with said node if said merge vector average equals or exceeds a predetermined threshold value, whereby said stored location identifiers represent locations in said natural language text containing information responsive to said query;

whether said contribution flag is true or not:
performing, at each node in said data structure, said steps of producing a match vector, merging, setting a contribution flag, and, if said contribution flag is set to true, averaging and storing, wherein all said steps are performed at each said node after substituting for said parent vector said merge vector that resulted from performing said merging step on said parent node of said node; and displaying on said video monitor said stored location identifiers.

4. The method of claim 3, wherein
said storing step further comprises the step of storing said merge vector average as a confidence score associated with said stored location identifiers, and
said displaying step further comprises the step of displaying on said video monitor said confidence scores associated with said stored location identifiers.

5. The method of claim 3, further comprising the steps of:
after producing the match vector:
averaging said match elements to produce a match vector average;
adding a constant value to said match vector average to produce an enhanced match vector average if said match vector average equals or exceeds said predetermined threshold;
said storing step further comprising the steps of:
if said merge vector average equals or exceeds said predetermined threshold and said contribution flag is set to true:
if said enhanced match vector average is greater than said merge vector average, storing for display said enhanced match vector average as a confidence score associated with said stored location identifiers; and
if said enhanced match vector average is not greater than said merge vector average, storing for display said merge vector average as a confidence score associated with said stored location identifiers;
said performing step further comprising the step of performing the above steps at each node in said data structure; and
said displaying step further comprising the step of displaying on said video monitor said confidence scores associated with said stored location identifiers.

6. The method of claim 5, further comprising the steps of:
after said setting step:
if said contribution flag is not true:
successively replacing one element of the parent vector at a time with the corresponding match element to produce a semi-merge vector, wherein said semi-merge vector comprises all the elements of the parent vector except for the substituted match element, either until the average of the elements of said semi-merge vector equals or exceeds the predetermined threshold and the corresponding match element exceeds zero value, or until each element of the parent vector has been subject to replacement; and thereafter setting said semi-merge vector equal to a nil value if the average of the elements of said semi-merge vector does not equal or exceed the threshold; if said semi-merge vector is not nil:
averaging the elements of said semi-merge vector to produce a semi-merge vector average;
if said enhanced match vector average is greater than said semi-merge vector average, storing for display said enhanced match vector average as a confidence score associated with said stored location identifiers; and
if said enhanced match vector average is not greater than said semi-merge vector average, storing for display said semi-merge vector average as a confidence score associated with said stored location identifiers,
wherein said performing step further comprises the step of performing the above steps at each node in said data structure.

7. The method of claim 6, wherein said averaging step to produce the semi-merge vector average comprises the steps of adding together the elements of said semi-merge vector to produce a semi-merge vector total, and dividing the semi-merge vector total by the number of elements in said semi-merge vector to produce said semi-merge vector average.

8. The method of claim 5, wherein said averaging step to produce the match vector average comprises the steps of adding together said match elements to produce a total, and dividing the total by the number of match elements in said match vector to produce said match vector average.

9. The method of claim 3, wherein the step of producing the match vector comprises the steps of:
comparing each said query constituent with each said node constituent at a particular node to produce a constituent value representative of a degree of similarity between said query constituent and said node constituent; and
setting each said match element equal to the highest constituent value obtained as a result of comparing the query constituent corresponding to said match element to each said node constituent.

10. The method of claim 9, further comprising the steps of:
after said comparing step:
if the comparison of two or more query constituents to the same node constituent results in the highest constituent values obtained for said two or more query constituents:
selecting the greatest of said highest constituent values and setting the match element in the position corresponding to the query constituent associated with said greatest constituent value to the greatest constituent value;

setting the match elements corresponding in position to the remaining query constituents that resulted in the highest match to the same node to the next highest constituent value obtained as a result of comparing said remaining query constituents to the other node constituents; and repeating said selecting and setting steps immediately above if two or more of the remaining query constituents again result in the highest match to the same node constituent.

11. The method of claim 3, wherein said averaging step to produce the merge vector comprises the steps of adding together said merge elements to produce a total, and dividing the total by the number of merge elements in said merge vector to produce said merge vector average.

12. The method of claim 3, further comprising the step of a user inputting the query.

13. The method of claim 3, further comprising the step of determining the threshold value according to a user input.

14. The method of claim 3, wherein said location identifiers are page numbers.

15. The method of claim 3, said displaying step further comprising the step of displaying on said video monitor the text of the locations containing information responsive to said query.

16. A system for locating information in a natural language text using a computer including a video monitor and a memory device for storing a data structure representing the natural language text, wherein said data structure has a tree structure having nodes and levels, each node representing information from associated locations in said text, each of said locations having a corresponding location identifier, the information in each node being a categorical subset of information represented by a parent node of each node, each node being one level below its parent node in the tree structure and containing node constituents, said parent node and the nodes at higher levels of the tree structure that represent more general categories of information than the information represented by a node being ancestors of that node, the system comprising:

query formatting means for formatting a query regarding information in the text into a query data structure;

comparison means for comparing the query data structure to a node to produce a comparison value representative of the degree of similarity between the query and the information represented by the node;

enhancing means for enhancing the comparison value by an amount representative of the degree of similarity between the query and the information represented by ancestors of the node to produce an enhanced comparison value;

storing means for storing the location identifiers associated with the node if the enhanced comparison value exceeds a predetermined lower bound and the node contributes information responsive to the query; and display means for displaying the stored location identifiers on the video monitor.

17. A system for locating information in a natural language text using a computer including a video monitor and a memory device for storing a data structure representing said natural language text, wherein said data structure has a tree structure having nodes and levels, each said node representing information from associated locations in said text, each of said locations having a corresponding location identifier, the information in a node being a categorical subset of information represented by a parent node of that node, each said node being one level below its parent node in said tree structure and containing node constituents, said system comprising:

query formatting means for formatting a query regarding information in said text into a query data structure containing constituents of said query, each said query constituent representing a word or a phrase contained in said query;

matching means for producing a match vector having a plurality of match elements, said match vector being representative of a degree of similarity between said query data structure and one of said nodes, and each said match element corresponding in position to a predetermined query constituent and to a predetermined parent element of a parent vector;

merging means for merging said match vector with said parent vector to produce a merge vector having a plurality of merge elements, wherein each said merge element corresponds in position to a predetermined parent element, by setting each said merge element to be equal to the greater of its corresponding parent element and the match element corresponding to the corresponding parent element;

contribution detecting means for setting a contribution flag to true if any of said match elements is greater than zero and, at the same time, greater than or equal to said parent element corresponding to said match element;

contribution testing means for determining whether said contribution flag is set to true;

merge averaging means responsive to said contribution testing means for averaging said merge elements to produce a merge vector average;

threshold testing means for determining whether said merge vector average equals or exceeds a predetermined threshold value;

storing means responsive to said threshold testing means for storing the location identifiers associated with said node if said merge vector average equals or exceeds said predetermined threshold value, whereby stored location identifiers represent locations in said natural language text containing information responsive to said query;

substitution means for substituting said merge vector for said parent vector; and display means for displaying on said video monitor said stored location identifiers.

18. The system of claim 17, said storing means further comprising means for storing said merge vector average as a confidence score associated with said stored location identifiers, and said display means further comprising means for displaying on said video monitor said confidence scores associated with said stored location identifiers.

19. The system of claim 17, further comprising:
match averaging means for averaging said match elements to produce a match vector average;
reward means for adding a constant value to said match vector average to produce an enhanced match vector average if said match vector average equals or exceeds said predetermined threshold;
comparison means for outputting the greater of said enhanced match vector average and said merge vector average;
said storing means coupled to said comparison means for storing for display the output of said comparison means as a confidence score associated with said stored location identifiers; and
said display means further comprising means for displaying on said video monitor said confidence scores associated with said stored location identifiers.

20. The system of claim 19, further comprising:
semi-merge means coupled to said contribution testing means for successively replacing one element of the parent vector at a time with the corresponding match element to produce a semi-merge vector if said contribution flag is not true, wherein said semi-merge vector comprises all the elements of the parent vector except for the substituted match element, either until the average of the elements of said semi-merge vector equals or exceeds the predetermined threshold and the corresponding match element exceeds zero value, or until each element of the parent vector has been subject to replacement, and for thereafter setting said semi-merge vector to a nil value if the average of the elements of said semi-merge vector does not equal or exceed the threshold;
semi-merge testing means for determining whether said semi-merge vector is nil;
semi-merge averaging means responsive to said semi-merge testing means for averaging the elements of said semi-merge vector to produce a semi-merge vector average if said semi-merge vector is not nil; and
said comparison means further comprising means for outputting the greater of the enhanced matched vector average and the semi-merge vector average.

21. The system of claim 17, wherein said matching means comprises means for comparing each said query constituent with each said node constituent at a particular node to produce a constituent value representative of a degree of similarity between said query constituent and said node constituent, and for setting each said match element equal to the highest constituent value obtained as a result of comparing the query constituent corresponding to said match element to each said node constituent.

22. The system of claim 21, further comprising:
check means for setting a check flag if the comparison of two or more query constituents to the same node constituent results in the highest constituent values obtained for said two or more query constituents;
means coupled to said check means for selecting the greatest of said highest constituent values and setting the match element in the position corresponding to the query constituent associated with said greatest constituent value to the greatest constituent value if said check flag is set;
means for setting the match elements corresponding in position to the remaining query constituents that resulted in the highest match to the same node to the next highest constituent value obtained as a result of comparing said remaining query constituents to the other node constituents if said check flag is set.

23. The system of claim 17, further comprising query input means for enabling a user to input the query.

24. The system of claim 17, further comprising a threshold input means for determining said threshold value in response to a user input.

25. The system of claim 17, wherein said location identifiers are page numbers.

26. The system of claim 17, wherein said display means further comprises means for displaying on said video monitor the text of the locations containing information responsive to said query.

* * * * *